(12) United States Patent
Takahashi

(10) Patent No.: US 10,101,516 B2
(45) Date of Patent: Oct. 16, 2018

(54) OPTICAL COMPENSATION PLATE

(71) Applicant: FUJIFILM CORPORATION, Tokyo (JP)

(72) Inventor: Hiroki Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 216 days.

(21) Appl. No.: 14/663,477

(22) Filed: Mar. 20, 2015

(65) Prior Publication Data

US 2015/0192723 A1  Jul. 9, 2015

Related U.S. Application Data

(63) Continuation of application No. PCT/JP2013/072855, filed on Aug. 27, 2013.

(30) Foreign Application Priority Data

Sep. 28, 2012  (JP) .................................. 2012-218048

(51) Int. Cl.
*G02B 5/30* (2006.01)
*G02B 1/11* (2015.01)
(Continued)

(52) U.S. Cl.
CPC .............. *G02B 5/3083* (2013.01); *G02B 1/11* (2013.01); *G02B 1/118* (2013.01); *G02B 1/18* (2015.01);
(Continued)

(58) Field of Classification Search
CPC .......... G02B 5/3083; G02B 1/02; G02B 1/08; G02B 1/18; G02B 1/11; G02B 1/118;
(Continued)

(56) References Cited

U.S. PATENT DOCUMENTS 6,555,955 B1 * 4/2003 Honda .............. G02F 1/133514
313/479
2006/0092358 A1  5/2006 Fujii et al.
(Continued)

FOREIGN PATENT DOCUMENTS

JP  08-122523  5/1996
JP  08-211202  8/1996
(Continued)

OTHER PUBLICATIONS

International Search Report—PCT/JP2013/072855.
German Official Action—11 2013 004 797.7—dated Mar. 21, 2016.

*Primary Examiner* — Jie Lei
*Assistant Examiner* — Mitchell Oestreich
(74) *Attorney, Agent, or Firm* — Young & Thompson

(57) ABSTRACT

An optical compensation plate comprises a substrate, a phase difference compensation layer, and an antireflection layer. The substrate is for example a glass substrate. The phase difference compensation layer is formed by oblique vapor deposition of an inorganic material on a surface of the substrate, and has a microstructure where columnar structures stand with inclination in relation to the surface of the substrate. The antireflection layer is provided on the upper side of the phase difference compensation layer, and has an uneven structure equally formed on one surface.

8 Claims, 3 Drawing Sheets

(51) Int. Cl.
*G02B 1/18* (2015.01)
*G02F 1/13363* (2006.01)
*G02F 1/1335* (2006.01)
*G02B 1/118* (2015.01)

(52) U.S. Cl.
CPC .... *G02F 1/13363* (2013.01); *G02F 1/133502* (2013.01); *G02F 1/133634* (2013.01); *G02F 2001/133638* (2013.01)

(58) Field of Classification Search
CPC ........... G02F 1/133502; G02F 1/13363; G02F 1/133634; G02F 2001/133638
USPC .................................................... 359/489.03
See application file for complete search history.

(56) References Cited

U.S. PATENT DOCUMENTS

2006/0109399 A1* 5/2006 Kubota ................ G02B 5/3041
349/96

2007/0258029 A1 11/2007 Nakagawa et al.
2010/0026918 A1 2/2010 Nakagawa et al.
2013/0094089 A1 4/2013 Isurugi et al.

FOREIGN PATENT DOCUMENTS

| | | | |
|---|---|---|---|
| JP | 09-297214 | | 11/1997 |
| JP | 11-281802 | | 10/1999 |
| JP | 2000-052492 | | 2/2000 |
| JP | 2001-183506 | | 7/2001 |
| JP | 2001183506 A | * | 7/2001 |
| JP | 2001-228330 | | 8/2001 |
| JP | 2001228330 A | * | 8/2001 |
| JP | 2006-119444 | | 5/2006 |
| JP | 2006-133617 | | 5/2006 |
| JP | 2006-171328 | | 6/2006 |
| JP | 2006-308832 | | 11/2006 |
| WO | 2011/135976 | | 11/2011 |

* cited by examiner

OPTICAL COMPENSATION PLATE

CROSS-REFERENCE TO RELATED APPLICATIONS

This application is a Continuation of PCT International Application No. PCT/JP2013/072855 filed on Aug. 27, 2013, which claims priority under 35 U.S.C. § 119 to Japanese Patent Application No. 2012-218048, filed Sep. 28, 2012. Each of the above application(s) is hereby expressly incorporated by reference, in its entirety, into the present application.

BACKGROUND OF THE INVENTION

1. Field of the Invention

The present invention relates to an optical compensation plate which is used for a liquid crystal display and so on to compensate a phase difference of light.

2. Description Related to the Prior Art

A liquid crystal projector, in which an image and so on displayed on a liquid crystal display (LCD) is magnified and projected toward a screen, is widespread. As is generally known, the liquid crystal display has a structure that polarizing plates are disposed in a cross Nicol arrangement on both sides of a liquid crystal panel, and displays an image and so on by controlling an orientation state of liquid crystal molecules of every pixel to regulate light transmission. In addition, as for the liquid crystal panel, since a thickness and so on of a liquid crystal layer is regulated to precisely display white and black with perpendicularly incident light, it occurs a component to leak out from the emitting side polarizing plate even when displaying black, in case there is light passing the liquid crystal layer diagonally.

In the liquid crystal projector, since contrast of the projection image decreases when a leak of light occurs by the oblique incidence, a phase difference of diagonally incident light is compensated by an optical compensation plate to improve contrast. As the optical compensation plate, for example, one in which a phase difference compensation layer is formed by a dielectric multilayer film layer where two kinds of dielectric thin films varied in an index of refraction are alternately laminated on a glass substrate (so-called negative C-plate), and one in which a phase difference compensation layer is formed by an oblique deposition film made by depositing an inorganic material from a diagonal direction (so-called O-plate) are known by United States Patent Application Publication 2010/0026918 (corresponding to International Patent Application Publication 2008/078764).

Usually, an antireflection layer is established to suppress a surface reflection on a surface of an optical element. The optical compensation plate is no exception, and it is preferable that the antireflection layer is established on its surface. As the antireflection layer, for example, it is used a dielectric multilayer film layer consisting of a dielectric multilayer film where dielectric thin films varied in an index of refraction are alternately laminated. In this way, a malfunction hardly occurs in case the antireflection layer formed by the dielectric multilayer film layer is additionally formed on the optical compensation plate where the phase difference compensation layer is formed by the dielectric multilayer film layer. In addition, in this case, the phase difference compensation layer itself may have antireflection characteristics.

On the other hand, as for an optical compensation plate in which a phase difference compensation layer is formed of an oblique deposition film, there is a problem that the optical compensation plate is charged with electricity and becomes easy to adsorb dust and dirt, in case a dielectric multilayer film layer is formed on the oblique deposition film. When dust and dirt attach to the surface of the optical compensation plate, rightly quality of a display image decreases. Even if there is translucency in extraneous dust and dirt, since a phase difference is not compensated precisely in the part of extraneous dust and dirt, contrast performance turns worse. Especially in case of the optical compensation plate is used for the liquid crystal projector, since an image is magnified and projected, projection image deterioration becomes easy to be outstanding even by minute dust and dirt.

SUMMARY OF THE INVENTION

An object of the present invention is to provide an optical compensation plate which can prevent image deterioration by adhesion of dust and dirt.

To achieve the above and other objects, an optical compensation plate of the present invention comprises a phase difference compensation layer, an antireflection layer and an intermediate layer. The phase difference compensation layer is formed by oblique vapor deposition of an inorganic material on a surface of a substrate, and has a microstructure where columnar structures stand with inclination in relation to the surface of the substrate. The antireflection layer is provided on the upper side of the phase difference compensation layer, and has an uneven structure by a mesh-porous structure equally formed on one surface. The intermediate layer has a first dense film formed of a material same as the phase difference compensation layer and a second dense film formed of a material same as the antireflection layer. The first dense film is provided at a side of the intermediate layer nearest to the phase difference compensation layer, and the second dense film is provided at a side of the intermediate layer nearest to the antireflection layer. Note that in the following explanation, as for each layer, the substrate side is referred to as the lower side, and the side apart from the substrate is referred to as the upper side.

It is preferable for the antireflection layer to be formed of zinc oxide.

Furthermore, it is preferable that a first dielectric multilayer film layer where at least two kinds of dielectric thin films varied in an index of refraction are alternately laminated is provided between the substrate and the phase difference compensation layer.

In addition, the intermediate layer may comprise a second dielectric multilayer film layer where at least two kinds of dielectric thin films varied in an index of refraction are laminated between the first dense film and the second dense film.

It is preferable to provide an oil-resistant coating on the upper part of the antireflection layer. It is preferable that the oil-resistant coating is formed of magnesium fluoride.

The antireflection layer may be a moth-eye structure itself in which needle-like or rod-like crystals stand perpendicularly to a surface.

According to the optical compensation plate of the present invention, adhesion of dust and dirt is prevented by the antireflection layer having the structure similar to the moth-eye structure, so that image degradation caused by dust and dirt is prevented.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

First Embodiment

Figure 1:
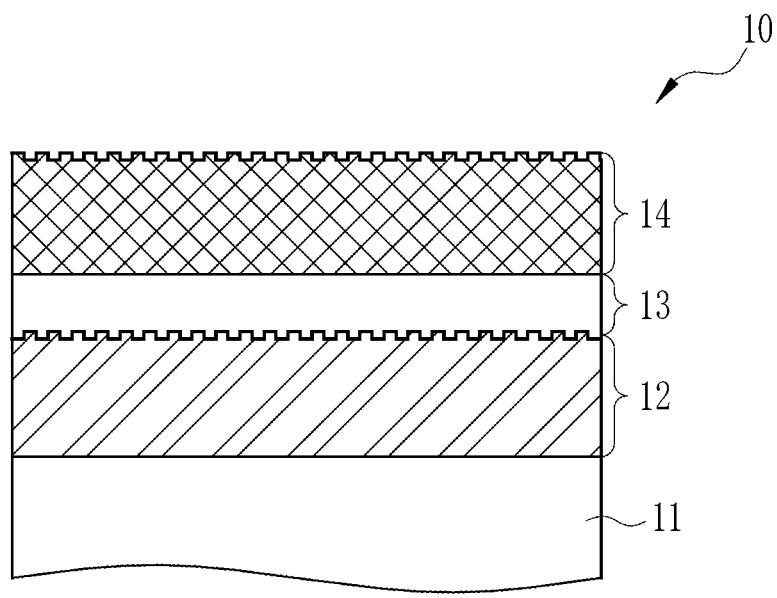
FIG. 1 is a cross-sectional view illustrating a laminar structure of an optical compensation plate.

As illustrated in FIG. 1, an optical compensation plate 10 is formed by laminating a phase difference compensation layer 12, an intermediate layer 13, and antireflection layer 14 in this order on a substrate 11.

The substrate 11 is for example a glass substrate. Films such as TAC or PET, acrylic acid resins, and organic glasses such as polycarbonate may be used for the substrate 11. However, it is preferable to use inorganic glasses. This is because there is almost no time degradation even in case it is used in severe environment such as in liquid crystal projectors. In addition, though it is not illustrated, an antireflection layer is formed on the back surface of the substrate 11 (the surface opposite to the surface on which the phase difference compensation layer 12 is provided). For example, the antireflection layer is formed of a dielectric multilayer film.

The phase difference compensation layer 12 is a layer formed of an oblique deposition film made by depositing an inorganic material from a diagonal direction to the substrate 11, and has a microstructure where columnar structures stand with inclination in relation to the surface of the substrate 11. By a structural birefringence based on this sloping columnar structure, a predetermined phase difference is given to light penetrating the phase difference compensation layer 12. Accordingly, the optical compensation plate 10 functions as an O-plate compensating a phase difference resulting from a pre-tilt of liquid crystal molecules of a VA type liquid crystal panel.

In addition, each of columnar structure bodies forming the phase difference compensation layer 12 is for example of several nm to several hundred nm order, and parameters such as an inclination angle and a density of the columnar structure bodies, a thickness of the phase difference compensation layer 12 are determined according to a degree of a phase difference to be compensated by the optical compensation plate 10 and manufacturing suitability. Although an inorganic material for forming the oblique deposition film of the phase difference compensation layer 12 is arbitrary, for example, tantalum pentoxide ($Ta_2O_5$), niobium pentoxide ($Nb_2O_5$), titanium dioxide ($TiO_2$), silicon dioxide ($SiO_2$) and so on can be used.

In case the intermediate layer 13 is formed of one material, it is formed of the material same as the phase difference compensation layer 12 or the antireflection layer 14, or the material whose index of refraction is between the phase difference compensation layer 12 and the antireflection layer 14. However, the Intermediate layer 13 is a dense film (so-called solid film) which does not have minute internal structures such as the phase difference compensation layer 12 and the antireflection layer 14. Accordingly, the intermediate layer 13 is formed by normal vacuum vapor deposition method or CVD to let material particles deposit uniformly from approximately perpendicular direction to the surface of the substrate 11.

For example, in case a material ($Ta_2O_5$ or so on) same as the phase difference compensation layer 12 is used for forming the intermediate layer 13, the intermediate layer 13 can be formed by evaporation performed while turning the substrate 11, with the surface of the phase difference compensation layer 12 being faced directly to an evaporation source after having formed the phase difference compensation layer 12 on the surface of the substrate 11. In addition, in case a material (ZnO or so on) same as the antireflection layer 14 is used for forming the intermediate layer 13, the intermediate layer 13 can be formed by preparing an evaporation source of the material same as the antireflection layer 14 in a vapor deposition device to form the phase difference compensation layer 12, and performing evaporation as described above with the surface of the phase difference compensation layer 12 being faced directly to the evaporation source.

The antireflection layer 14 is formed for example of zinc oxide (ZnO) or alumina ($Al_2O_3$), and has a mesh-porous structure in which rod-like (or needle-like) crystals are connected with each other complicatedly. This mesh-porous structure is an uneven structure of about the visible light wavelength order (several nm–several hundred nm) being formed equally on one surface by at least mashes and holes on the surface, which is similar to a minute uneven structure like eyes of a moth (so-called moth-eye structure). Therefore, the antireflection layer 14 shows antireflection property by the uneven structure on the one surface, due to the same principle as the moth-eye structure.

In case the mesh-porous structure is formed of zinc oxide, for example, it may be that solution including zinc nitrate and ethylene diamine is coated on the surface of the intermediate layer 13, and then solvents are vaporized to precipitate zinc oxide. Also it may be that the substrate 11 on which the phase difference compensation layer 12 and the intermediate layer 13 are provided is immersed in solution including zinc nitrate and ethylene diamine, and then heated to precipitate zinc oxide. In addition, in case alumina is used, a mesh-porous structure can be made by performing warm water treatment after an alumina thin film having been formed on the intermediate layer 13.

As described above, the optical compensation plate 10 functions as the O-plate by the phase difference compensation layer 12, and surface reflection can be suppressed since the antireflection layer 14 is provided.

In case the antireflection layer 14 is formed directly on the phase difference compensation layer 12, since both the phase difference compensation layer 12 and the antireflection layer 14 have minute internal structure, adhesion between the surfaces on which such microstructure was exposed becomes poor. Therefore, it becomes difficult to manufacture, and increases manufacturing cost even if it can be manufactured. In addition, it has a difficulty in durability to be used under the severe environment in the liquid crystal projector. However, in the optical compensation plate 10, by providing the dense intermediate layer 13 between the phase difference compensation layer 12 and the antireflection layer 14, adhesion between the phase difference compensation layer 12 and intermediate layer 13 and adhesion between the intermediate layer 13 and the antireflection layer 14 are improved. In other words, since the optical compensation plate 10 has good adhesion between the phase difference compensation layer 12 and the antireflection layer 14 due to the intermediate layer 13, it has excellent manufacturing suitability and durability to be used under the severe environment in the liquid crystal projector and so on.

Furthermore, dust and dirt is hard to adhere to the optical compensation plate 10, since the unevenness by the mesh-porous structure of the antireflection layer 14 is exposed on the surface. Since zinc oxide has conductivity, in case zinc oxide (ZnO) is used for the antireflection layer 14, the optical compensation plate 10 is prevented from being charged with electricity and becomes hard to adsorb dust and dirt, so that dust-proof performance becomes especially good.

For an evaluation of the dust-proof performance, the optical compensation plate 10 of the first embodiment where the unevenness is exposed on the surface (zinc oxide is used for the antireflection layer 14), and an optical compensation plate for a comparison provided with an antireflection layer formed of the dielectric multilayer film and having a flat surface on the phase difference compensation layer 12, were manufactured. Then a surface of each antireflection layer was rubbed with cloth to be electrified, beads (10 μm φ) for dust-proof test were put on it, extra beads which were not absorbed are shook off, and the number of the adsorbed beads in the area of 3×3 mm was counted. This dust-proof evaluation was repeated several times. As a result, the number of the absorbed beads was almost less than 300 in case of the optical compensation plate 10, but it was almost more than 500 in case of the optical compensation plate for the comparison. From this, it is understood that the optical compensation plate 10 has dust-proof performance improved from the conventional one.

Second Embodiment

Figure 2:
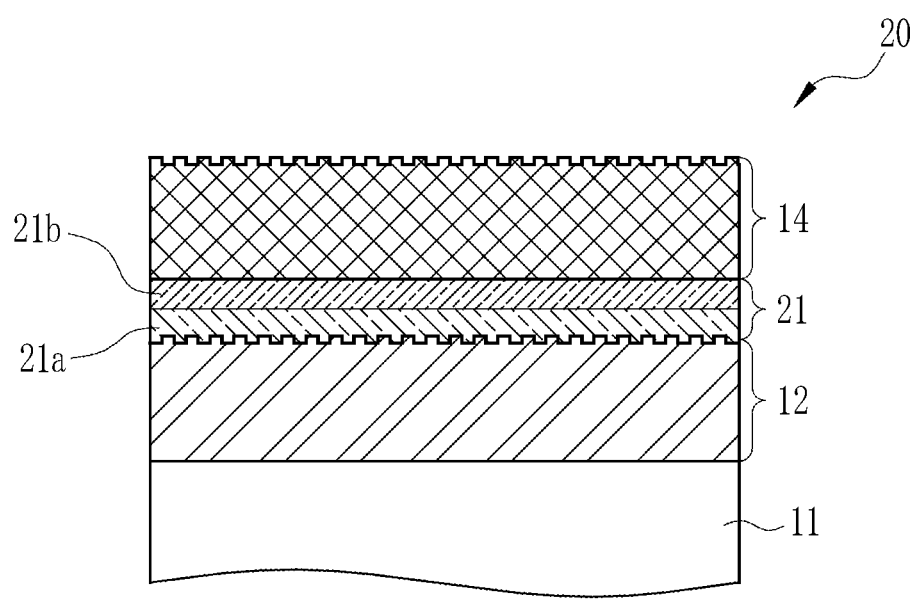
FIG. 2 is a cross-sectional view illustrating an especially favorable laminar structure of an optical compensation plate.

In the optical compensation plate 10 of the first embodiment, the intermediate layer 13 is formed of one film made of a material same as one of the phase difference compensation layer 12 and the antireflection layer 14. However, like an optical compensation plate 20 illustrated in FIG. 2, it is preferable to form an intermediate layer 21 with two thin films of a first thin film 21a and a second thin film 22b. In this case, the first thin film 21a contacting to the phase difference compensation layer 12 is formed of a dense film made of a material same as the phase difference compensation layer 12, and the second thin film 21b contacting to the antireflection layer 14 is formed of a dense film made of a material same as the antireflection layer 14.

In this way, since the phase difference compensation layer 12 and the first thin film 21a are formed of the same material, and the second thin film 21b and the antireflection layer 14 are formed of the same material, adhesion becomes better than a case of formed of different materials. In addition, even in case there is a minute inner structure in the phase difference compensation layer 12 and the antireflection layer 14, since both of the first thin film 21a and the second thin film 21b are dense film, good adhesion is obtained between the intermediate layer 21 and the phase difference compensation layer 12, and good adhesion is obtained between the intermediate layer 21 and the antireflection layer 14. Therefore, like the optical compensation plate 20, by forming the intermediate layer 21 with two films of the first thin film 21a and the second thin film 21b, adhesion between the phase difference compensation layer 12 and antireflection layer 14 further improves from the optical compensation plate 10 of the first embodiment.

Third Embodiment

Figure 3:
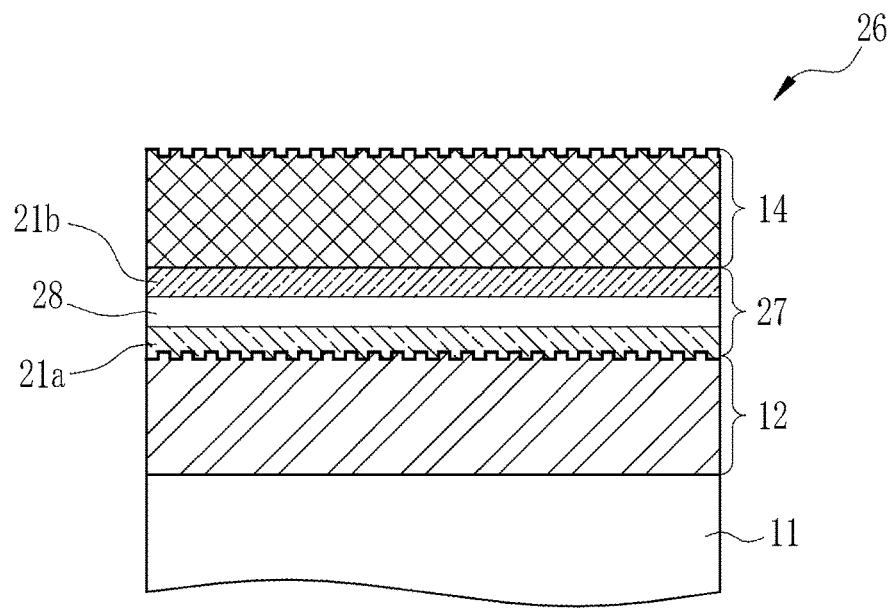
FIG. 3 is a cross-sectional view of an optical compensation plate where a negative C-plate is provided integrally.

In the optical compensation plate 20 of the second embodiment, the intermediate layer 21 is formed of two films of the first thin film 21a and the second thin film 21b. However, the intermediate layer 21 may be composed of a dielectric multilayer film layer having three films. In this case, as an intermediate layer 27 of as optical compensation plate 26 illustrated in FIG. 3, a third thin film 28 is added between the first thin film 21a and the second thin film 21b. It is preferable that materials and the number of films of the third thin film 28 are determined to provide a reflective index having a middle value between that of the first thin film 21a and that of the second thin film 21b, so that the refractive index difference between the first thin film 21a and the second thin film 21b is moderated. In this way, the intermediate layer 27 can maintain good adhesion with the phase difference compensation layer 12 and good adhesion with the antireflection membranous layer 14, and prevent reflection at the interface of the first thin film 21a and the second thin film 21b of the optical compensation plate 20. In case the intermediate layer 21 is formed of four or more films, the number of thin films provided between the first thin film 21a and the second thin film 21b may be increased.

In addition, in case the intermediate layer 21 is formed of three or more films, for example the third thin film 28 may be a layer formed of a dielectric multilayer film functioning as a negative C-plate (second dielectric multilayer film layer) provided between the first thin film 21a and the second thin film 21b. The negative C-plate is formed by alternately laminating at least two kinds of dielectric thin films varying in an index of refraction.

In case the negative C-plate is provided between the first thin film 21a and the second thin film 21b, since the flexibility of design is improved from a case in which the phase difference compensation is performed only by the phase difference compensation layer 12, more precise phase difference compensation is enabled. In addition, in comparison with a conventional case that a negative C-plate is arranged diagonally in relation to the optical axis to perform phase difference compensation, precision of the phase difference compensation improves, and the space for placing the negative C-plate arranged diagonally toward the optical axis is reduced so that downsizing or thinning of the liquid crystal projector can be made. However, since the optical compensation plate 20 is charged with electricity and becomes easy to adsorb dust and dirt in case the dielectric multilayer film layer is formed on the phase difference compensation layer 12, it is preferable that the antireflection layer 14 is formed of zinc oxide having conductivity to prevent charging of the optical compensation plate 20 with electricity in case the negative C-plate is provided between the first thin film 21a and the second thin film 21b. Of course, the dielectric multilayer film layer functioning as the negative C-plate can be formed of the intermediate layer 21 as a whole, that is, the whole of the first thin film 21a, the second thin film 21b, and the dielectric multilayer film provided therebetween.

Figure 4:
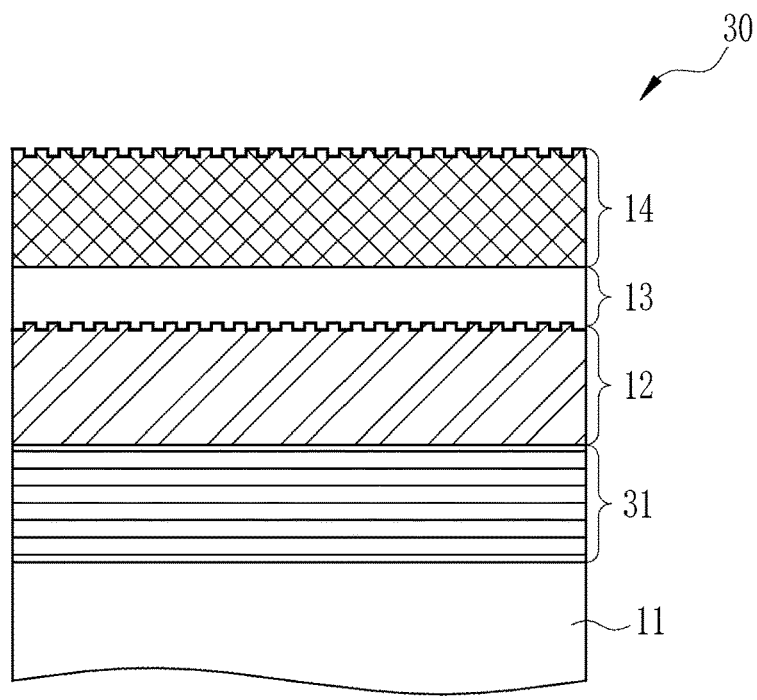
FIG. 4 is a cross-sectional view of an optical compensation plate where a negative C-plate is provided between a substrate and a phase difference compensation layer.

Like the optical compensation plate 10 of the first embodiment, in case the negative C-plate function is applied to an optical compensation plate in which the intermediate layer 13 is formed with one film, a dielectric multilayer film layer 31 forming the negative C-plate can be provided between the substrate 11 and the phase difference compensation layer 12, for example as an optical compensation plate 30 illustrated in FIG. 4.

Figure 5:
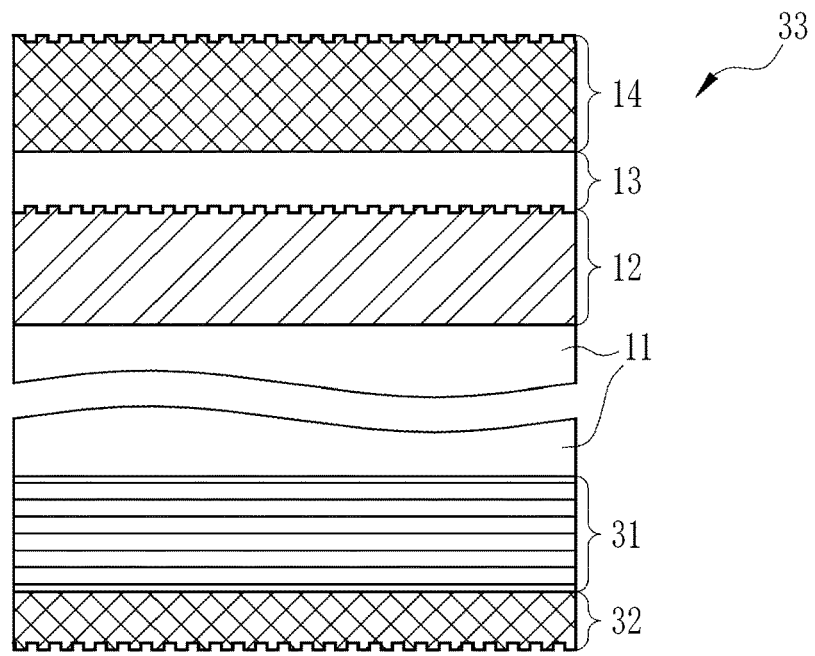
FIG. 5 is a cross-sectional view of an optical compensation plate where the negative C-plate is provided on the back side of the substrate.

In addition, like an optical compensation plate 33 illustrated in FIG. 5, a dielectric multilayer film layer 31 functioning as the negative C-plate may be provided on the rear surface of the substrate 11 (the surface opposite to the surface on which the phase difference compensation layer 12 is provided). An antireflection layer 32 is provided on the upper side of the dielectric multilayer film layer 31 (the side opposite to the substrate 11). The antireflection layer 32 may be the same as the antireflection layer provided at the back side of each optical compensation plate 10, 20, 26, 30 of the first and second embodiments, or may have the moth-eye structure (or a structure similar to the moth-eye structure). In FIG. 5, the antireflection layer 32 has the mesh-porous structure same as the antireflection layer 14.

In case the dielectric multilayer film layer 31 is provided on the rear surface of the substrate 11 as described, the intermediate layer 13 may be formed of one film made of a material same as the phase difference compensation layer 12 or the antireflection layer 14 as same as the optical compensation plate 10 of the first embodiment, or may have the two-film composition of the first thin film 21a and the second thin film 21b as same as the optical compensation plate 20 of the second embodiment. Furthermore, like the intermediate layer 27 of the optical compensation plate 26, the third thin film 28 may be added between the first thin film 21a and the second thin film 21b (see FIG. 3), to prevent the reflection at the interface of the first thin film 21a and the second thin film 21b.

Fourth Embodiment

In each optical compensation plate 10, 20, 26, 30, 33 of the first to third embodiment, the antireflection layer 14 of the mesh-porous structure is exposed on the surface. However, like the optical compensation plate 40 illustrated in FIG. 6, it is preferable to apply an oil-resistant coating 41 to the antireflection layer 14. For example, the oil-resistant coating 41 is formed of magnesium fluoride ($MgF_2$). In addition, the oil-resistant coating 41 may be formed of fluorine resin.

Although the optical compensation plates 10, 20, 26, 30, 33 are usually used for areas where a person does not touch directly, a serviceperson may accidentally touch the optical compensation plates 10, 20, 26, 30, 33, resulting of adherence of oils and fats, for example at the time of the maintenance of the liquid crystal projector. In this case it is difficult to completely wipe off oils and fats, and appropriate phase difference compensation effect cannot provided due to the remained oils and fats. In addition, in case the remained oils and fats penetrate into the phase difference compensation layer 12, the phase difference compensation performance turns worse. Therefore, in case the optical compensation plates 10, 20, 26, 30, 33 are used for the liquid crystal projector, contrast performance turns worse. However, by providing the oil-resistant coating 41, deterioration of phase difference compensation effect can be kept minimized because it is easy to wipe off oils and fats so that the remained oil and fats become few, even if oils and fats adhere to the optical compensation plate 40 by an accidental touch. In addition, upon incorporating the optical compensation plate 40 in the liquid crystal projector, it may happen that the optical compensation plates 10, 20, 26, 30, 33 are accidentally touched. However, since deterioration of phase difference compensation effect can be kept minimized in this case also, the yield can be improved and the assembling cost can be reduced by using the optical compensation plate 40 provided with the oil-resistant coating 41.

Figure 6:
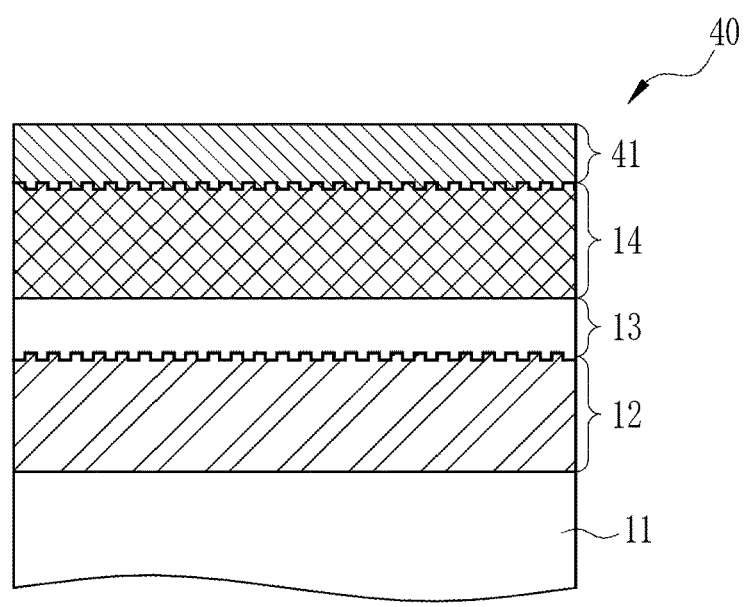
FIG. 6 is a cross-sectional view of an optical compensation plate on which an oil-resistant coating is applied.

Although the oil-resistant coating 41 is illustrated to be thick in FIG. 6, it is preferable to provide the oil-resistant coating 41 thinly so that the surface unevenness by the mesh-porous structure is not lost. As described above, this is because dust resistance improves by the surface unevenness. However, even if the oil-resistant coating 41 becomes thick as the surface becomes flat, antireflection performance of the antireflection layer 14 is almost unchanged unless the material of oil-resistant coating 41 infiltrates the antireflection layer 14.

Note that in the optical compensation plate 40 of FIG. 6, although the oil-resistant coating 41 is provided in the optical compensation plate 10 of the first embodiment, also in case of each optical compensation plate 20, 26, 30, 33 of the second and third embodiments, it is preferable to provide the oil-resistant coating 41 on the antireflection layer 14.

Note that in each optical compensation plate 10, 20, 26, 30, 33, 40 of the first to fourth embodiments, although the antireflection layer 14 has the mesh-porous structure which is similar to the moth-eye structure, the antireflection layer 14 may have the moth-eye structure itself where cylindrical crystals such as zinc oxide stand approximately perpendicularly on the surface.

Note that in each optical compensation plate 10, 20, 26, 30, 33, 40 of the first to fourth embodiments, although an antireflection layer (not illustrated) composed of a dielectric multilayer film is provided on the back side of the substrate 11, the antireflection layer provided on the rear surface of the substrate 11 may be the antireflection layer of the mesh-porous structure similar to the moth-eye structure, as same as the antireflection layer 14 on the front surface. In addition, it may be the antireflection layer of the moth-eye structure. Furthermore, on the back side of the substrate 11, for example the negative C-plate may be formed in addition to the antireflection layer.

Note that the optical compensation plates 10, 20, 26, 30, 33, 40 are especially suitable for a liquid crystal projector with use of a VA type liquid crystal panel. The placement in the liquid crystal projector is arbitrary between a polarizing plate (polarizer) which limits the state of polarization of light to be incident on the liquid crystal panel and a polarizing plate (analyzer) which limits the state of polarization of light to be emitted from the liquid crystal panel. The liquid crystal panel may be the transmissive type or the reflecting type.

In addition, the optical compensation plates 10, 20, 26, 30, 33, 40 can be used for a liquid crystal display for observing a display image directly. A view angle is improved by using the optical compensation plates 10, 20, 26, 30, 33, 40 for the liquid crystal display.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An optical compensation plate comprising:
a phase difference compensation layer formed by oblique vapor deposition of an inorganic material on a surface of a substrate, having a microstructure where columnar structures stand with inclination in relation to the surface of the substrate;

an antireflection layer provided on the upper side of the phase difference compensation layer, having an uneven structure on one surface, the antireflection layer being one of zinc oxide and alumina; and an intermediate layer formed of a dense film between the phase difference compensation layer and the antireflection layer, the intermediate layer having a first dense film formed of a material same as the phase difference compensation layer and a second dense film that is formed of a same one of zinc oxide and alumina as the antireflection layer, the first dense film being provided at a side of the intermediate layer nearest to the phase difference compensation layer, and the second dense film directly contacting the antireflection layer.

2. The optical compensation plate according to claim 1, wherein a first dielectric multilayer film layer where at least two kinds of dielectric thin films varied in an index of refraction are alternately laminated is provided between the substrate and the phase difference compensation layer.

3. The optical compensation plate according to claim 1, the intermediate layer including a second dielectric multilayer film layer where at least two kinds of dielectric thin films varied in an index of refraction are laminated between the first dense film and the second dense film.

4. The optical compensation plate according to claim 1, further comprising an oil-resistant coating on the upper part of the antireflection layer.

5. The optical compensation plate according to claim 4, wherein the oil-resistant coating is formed of magnesium fluoride.

6. The optical compensation plate according to claim 1, wherein the antireflection layer has a moth-eye structure in which needle-like or rod-like crystals stand perpendicularly to a surface.

7. The optical compensation plate according to claim 6, wherein the antireflection layer is formed of zinc oxide.

8. The optical compensation plate according to claim 1, wherein the uneven structure includes a mesh-porous structure.

* * * * *